US010223063B2

United States Patent
Gibson et al.

(10) Patent No.: US 10,223,063 B2
(45) Date of Patent: Mar. 5, 2019

(54) METHODS AND SYSTEMS FOR PERSONALIZING USER EXPERIENCE BASED ON DISCOVERY METRICS

(71) Applicant: Spotify AB, Stockholm (SE)

(72) Inventors: Clay Gibson, New York, NY (US); Will Shapiro, New York, NY (US); Santiago Gil, Portland, OR (US); Ian Anderson, New York, NY (US); Margreth Mpossi, Stamford, CT (US); Oguz Semerci, New York, NY (US); Scott Wolf, Brooklyn, NY (US); Benjamin Lacker, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 15/696,964

(22) Filed: Sep. 6, 2017

(65) Prior Publication Data
US 2018/0246961 A1 Aug. 30, 2018

Related U.S. Application Data

(60) Provisional application No. 62/463,553, filed on Feb. 24, 2017.

(51) Int. Cl.
| G06F 17/30 | (2006.01) |
| G06F 3/16 | (2006.01) |
| H04L 29/08 | (2006.01) |
| H04N 21/262 | (2011.01) |
| H04N 21/24 | (2011.01) |

(Continued)

(52) U.S. Cl.
CPC ........ *G06F 3/165* (2013.01); *G06F 17/30761* (2013.01); *G06F 17/30772* (2013.01); *H04L 67/22* (2013.01); *H04N 21/2407* (2013.01); *H04N 21/25891* (2013.01); *H04N 21/26258* (2013.01); *G06F 17/3053* (2013.01); *G10H 2240/131* (2013.01); *H04L 65/60* (2013.01)

(58) Field of Classification Search
CPC ............ G06F 17/273; G06F 17/30477; G06F 17/30554; G06F 17/30761; G06F 17/30772
USPC ........................................................ 707/751
See application file for complete search history.

(56) References Cited

U.S. PATENT DOCUMENTS 7,813,822 B1 * 10/2010 Hoffberg ............ G06K 9/00369
381/73.1
8,019,777 B2 * 9/2011 Hauser .............. G06F 17/30867
707/723

(Continued)

*Primary Examiner* — Hanh B Thai
(74) *Attorney, Agent, or Firm* — Morgan, Lewis & Bockius LLP

(57) ABSTRACT

An electronic device is associated with a media-providing service. The electronic has one or more processors and memory storing instructions for execution by the one or more processors. For each track of a plurality of tracks consumed by a user of the media-providing service, the electronic device determines, based on a listening history of the user with the media-providing service, whether the track has previously been consumed by the user. The electronic device determines, for the user, a discovery score based on a number of the plurality of tracks determined to not have been previously consumed by the user. The electronic device provides personalized content to the user based on the discovery score.

16 Claims, 6 Drawing Sheets

(51) Int. Cl.
*H04N 21/258* (2011.01)
*H04L 29/06* (2006.01)

(56) References Cited

U.S. PATENT DOCUMENTS

| | | | | |
|---|---|---|---|---|
| 8,060,525 B2* | 11/2011 | Svendsen | ......... | G06F 17/30041 707/769 |
| 8,521,766 B1* | 8/2013 | Hoarty | ............. | G06F 17/30023 707/769 |
| 8,805,831 B2* | 8/2014 | Svendsen | ............... | G11B 27/00 348/231.3 |
| 8,983,950 B2* | 3/2015 | Askey | ......... | G06F 17/30772 707/734 |
| 9,473,730 B1* | 10/2016 | Roy | ....................... | H04H 60/44 |
| 9,521,375 B2* | 12/2016 | Beaumier | ............. | G07F 11/002 |
| 9,578,374 B1* | 2/2017 | Whitten | ............. | H04N 21/4627 |
| 9,672,196 B2* | 6/2017 | Shachar | ............. | G06F 17/2247 |
| 9,767,158 B1* | 9/2017 | Lewis | ................ | G06F 17/3053 |
| 9,774,906 B2* | 9/2017 | Dion | ............... | H04N 21/439 |
| 2008/0005098 A1* | 1/2008 | Holt | ................. | G06F 17/30867 |
| 2009/0157512 A1* | 6/2009 | King | ...................... | G06Q 10/10 705/14.27 |
| 2009/0327193 A1* | 12/2009 | Eronen | ................. | G06Q 10/00 706/47 |
| 2010/0050202 A1* | 2/2010 | Kandekar | ......... | G06F 17/30244 725/14 |
| 2011/0282964 A1* | 11/2011 | Krishnaswamy | ...... | G06Q 30/02 709/217 |
| 2012/0304207 A1* | 11/2012 | Hughes | ................. | H04H 60/31 725/14 |
| 2013/0073473 A1* | 3/2013 | Heath | .................... | G06Q 30/02 705/319 |
| 2013/0196618 A1* | 8/2013 | Zalmanovitch | ....... | H04L 43/045 455/405 |
| 2013/0204825 A1* | 8/2013 | Su | ........................... | G06N 5/04 706/46 |
| 2014/0114985 A1* | 4/2014 | Mok | .................. | G06Q 30/0271 707/748 |
| 2014/0278686 A1* | 9/2014 | Mullings | ............ | G06Q 10/1097 705/7.21 |
| 2014/0310779 A1* | 10/2014 | Lof | ..................... | H04L 63/0421 726/4 |
| 2015/0026706 A1* | 1/2015 | Leamon | ............... | H04N 21/251 725/9 |
| 2015/0039644 A1* | 2/2015 | Trivedi | ................... | H04L 67/22 707/767 |
| 2015/0039685 A1* | 2/2015 | Lewis | .................... | G06Q 30/02 709/204 |
| 2015/0046267 A1* | 2/2015 | MacTiernan | ........... | H04L 51/32 705/14.66 |
| 2015/0058728 A1* | 2/2015 | Haggerty | ............... | G06Q 30/02 715/716 |
| 2015/0242513 A1* | 8/2015 | Sanghavi | .......... | G06F 17/30029 707/734 |
| 2015/0312632 A1* | 10/2015 | Hoctor | ................. | H04N 21/251 725/14 |
| 2015/0356447 A1* | 12/2015 | Lowe | ..................... | G06N 5/046 706/47 |
| 2015/0363061 A1* | 12/2015 | de Nigris, III | ..... | H04N 21/8113 715/717 |
| 2016/0050446 A1* | 2/2016 | Fujioka | ............ | G06F 17/30867 725/93 |
| 2016/0154861 A1* | 6/2016 | Hegerty | ............ | G06F 17/30554 707/728 |
| 2016/0357376 A1* | 12/2016 | Carrigan | ............ | G06F 3/0482 |
| 2016/0379123 A1* | 12/2016 | Younessian | ............... | G06N 5/04 706/52 |
| 2017/0093769 A1* | 3/2017 | Lind | ..................... | G06F 3/0481 |
| 2017/0238039 A1* | 8/2017 | Sabattini | ........... | G06F 17/30053 705/14.73 |
| 2018/0124444 A1* | 5/2018 | van Zwol | ........... | G06F 17/3053 |

* cited by examiner

METHODS AND SYSTEMS FOR PERSONALIZING USER EXPERIENCE BASED ON DISCOVERY METRICS

RELATED APPLICATION

This application claims priority to U.S. Provisional Application No. 62/463,553, filed Feb. 24, 2017, entitled "Personalizing Content Streaming Based on User Behavior," which is incorporated by reference in its entirety.

TECHNICAL FIELD

The disclosed implementations relate generally to personalizing the user experience for media streaming, and, in particular, to personalizing content in accordance with one or more metrics that measure degrees to which users discover new media content.

BACKGROUND

Access to electronic media, such as music and video content, has expanded dramatically over time. As a departure from physical media, media content providers (i.e., media-providing services) stream media to electronic devices (e.g., across wireless networks), improving the convenience with which users can consume and experience such content. As part of the service they provide and to assist users in having a positive user experience, media content providers track and process user data in an attempt to understand user preferences, and ultimately to provide relevant content personalization.

SUMMARY

Accordingly, there is a need for systems and methods for personalizing media content in accordance with one or more metrics that measure discovery of new media content. Calculating such metrics and applying the results to personalize content gives media-providing services a sophisticated tool for improving user experience.

In accordance with some implementations, a method is performed at an electronic device associated with a media-providing service. The electronic device includes one or more processors and memory storing instructions for execution by the one or more processors. The method includes, for each track of a plurality of tracks consumed by a user of the media-providing service, determining, based on a listening history of the user with the media-providing service, whether the track has previously been consumed by the user. The method further includes determining, for the user, a discovery score based on a number of the plurality of tracks determined to not have been previously consumed by the user. The method further includes providing personalized content to the user based on the discovery score.

In accordance with some implementations, an electronic device includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the electronic device, cause the electronic device to perform the operations of the method described above.

Thus, systems are provided with effective methods for personalizing content for users of a media-providing service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first metric could be termed a second metric, and, similarly, a second metric could be termed a first metric, without departing from the scope of the various described implementations. The first metric and the second metric are both metrics, but they are not the same metric.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
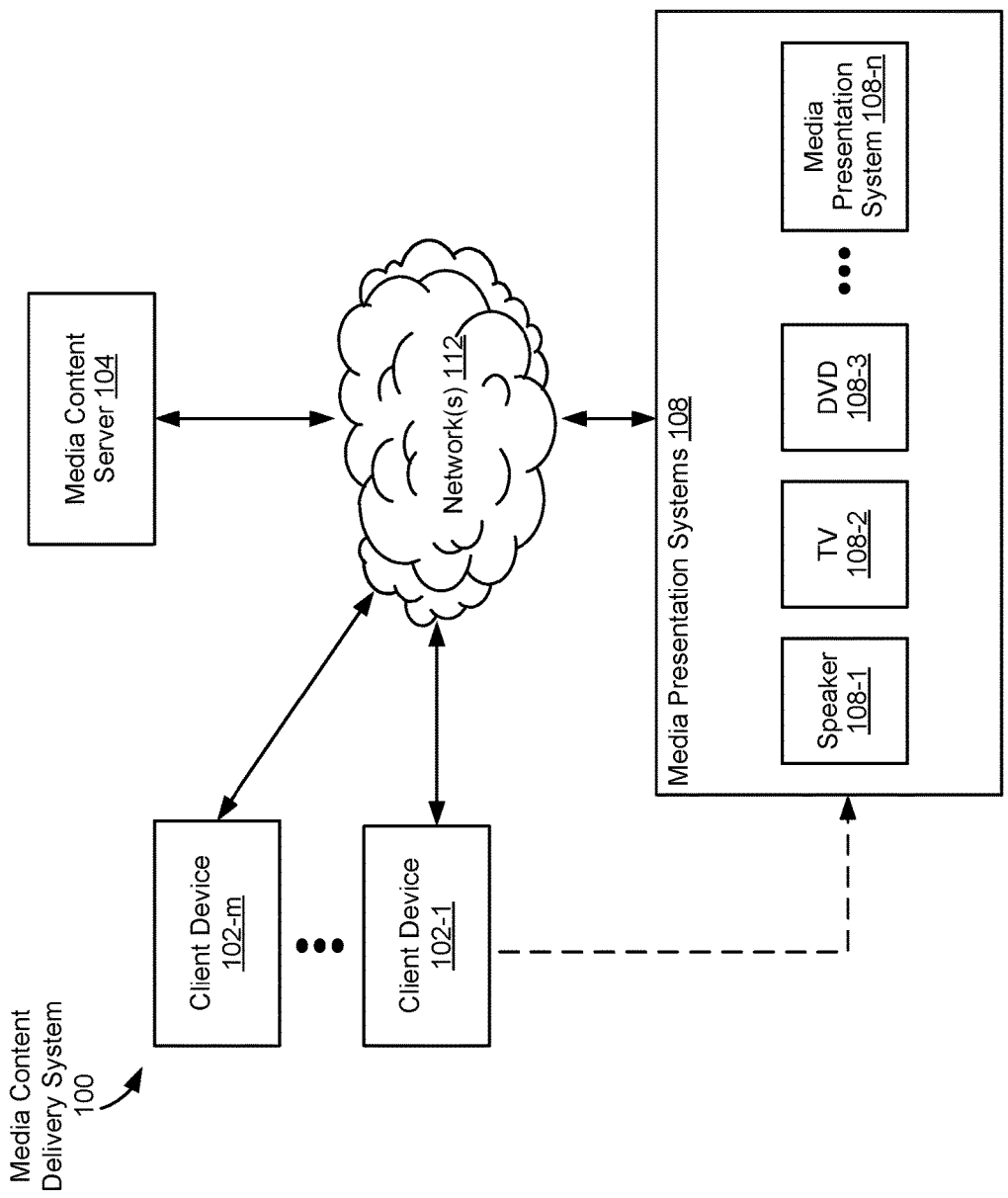
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-m is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-m are the same type of device (e.g., client device 102-1 and client device 102-m are both mobile devices). Alternatively, client device 102-1 and client device 102-m are different types of devices.

In some implementations, client devices 102-1 and 102-m send and receive media-control information through the networks 112. For example, client devices 102-1 and 102-m send media control requests (e.g., requests to play audio, movies, videos, or other media items, or playlists thereof) to media content server 104 through network(s) 112. Additionally, client devices 102-1 and 102-m, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-m each include a media application 322 (FIG. 3) that allows a user of the client device to browse, request (e.g., for playback at the client device 102 and/or a media presentation system 108), and/or present media content (e.g., control playback of audio, videos, etc.). Media content may be stored locally (e.g., in memory 312 of the client device 102, FIG. 3) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 322 of client device 102-1 and/or 102-m) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Content provided to a media presentation system 108 may be personalized for a respective user (e.g., a user of a client device 102) based on one or more metrics that quantify the extent to which a user consumes familiar versus unfamiliar content. For example, a discovery score is calculated, based on a listening history of the user with the media-providing service, which captures whether the user prefers (e.g., tends to consume) new content or repeated (i.e., previously consumed) content. This score can then be used to personalize content for the user. For example, a certain ratio of familiar tracks to total tracks may be determined and used to select what content to provide to the user.

Figure 2A:
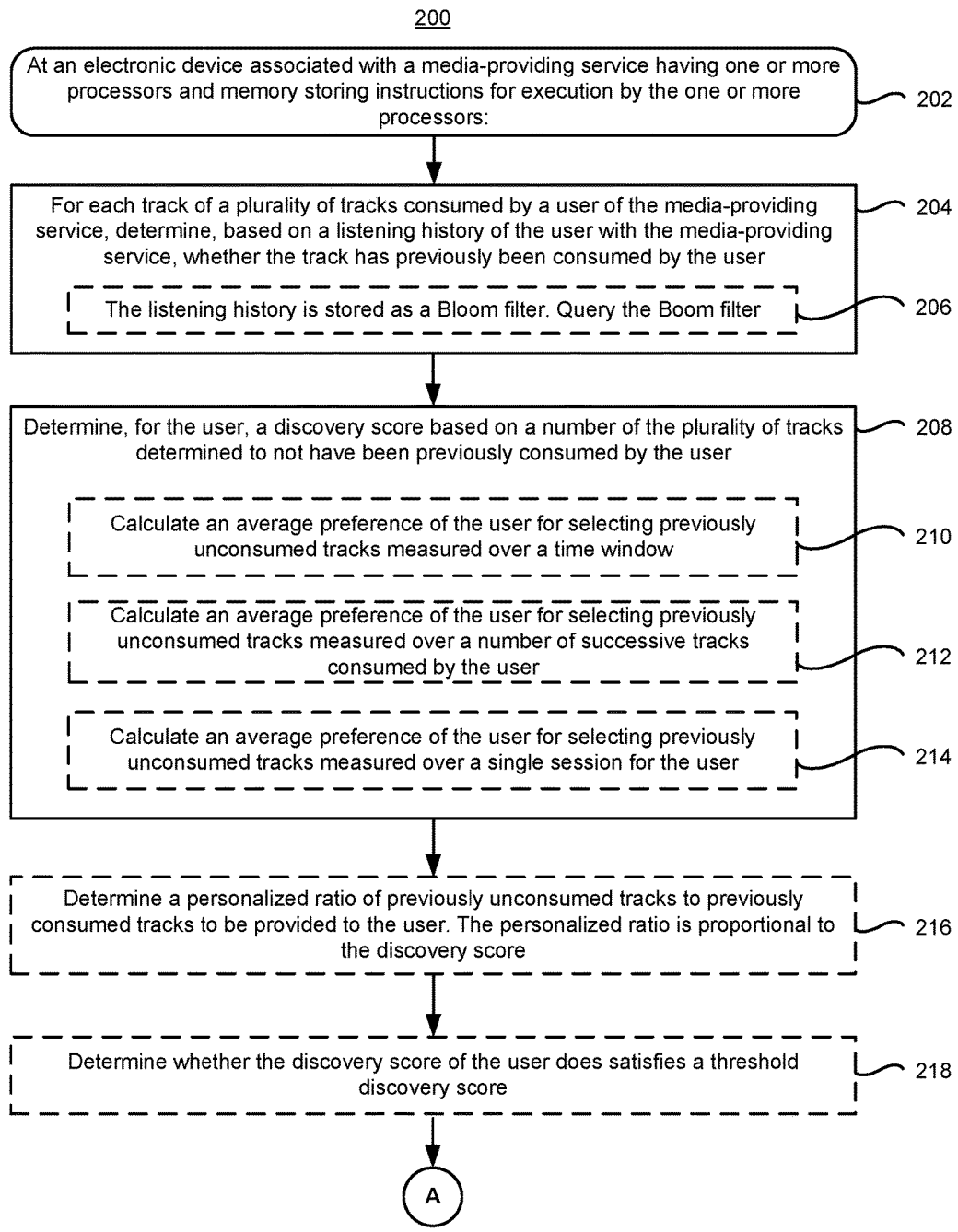
FIGS. 2A-2C are flow diagrams illustrating methods for providing personalized content in accordance with some implementations.
Figure 2B:
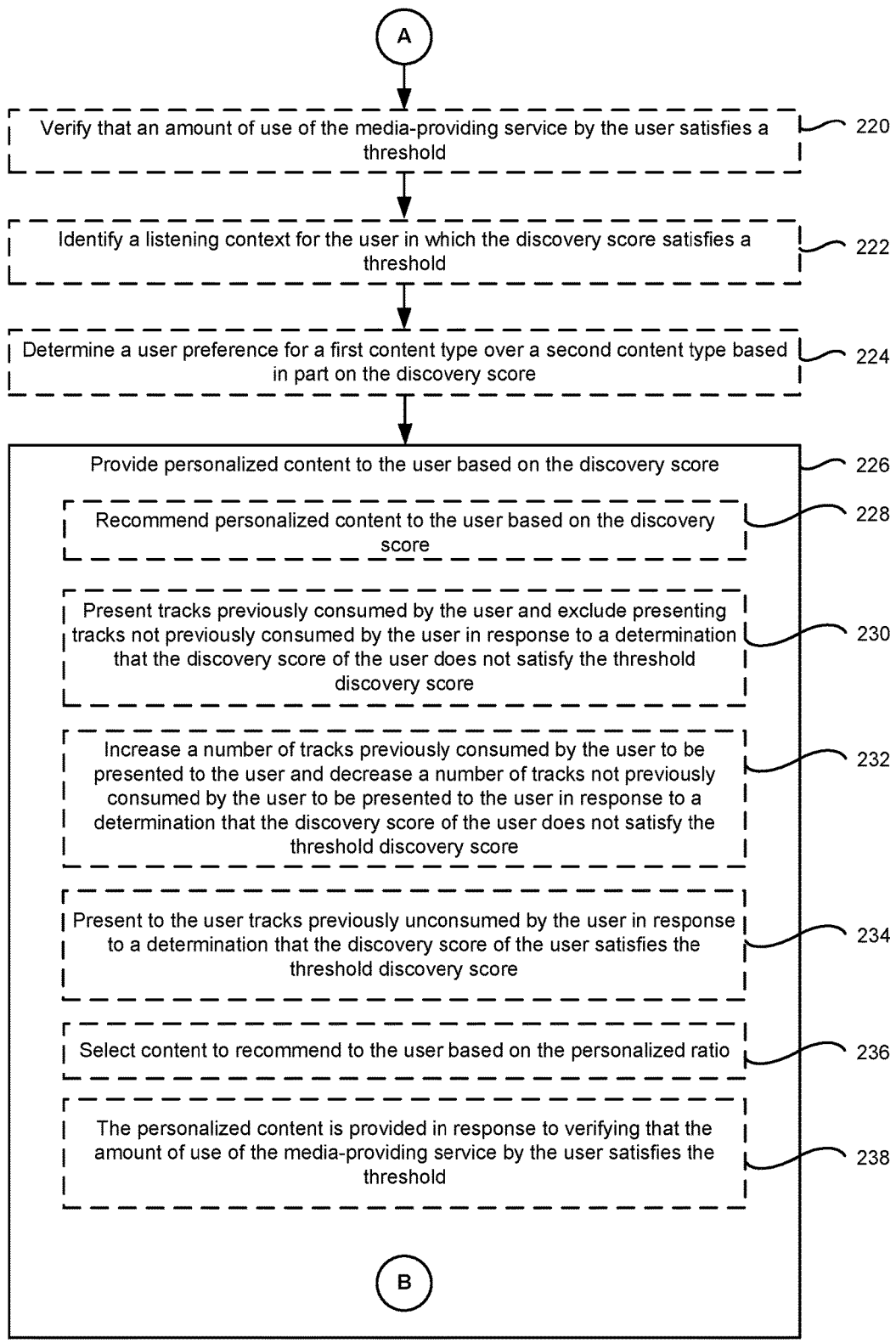
Figure 2C:
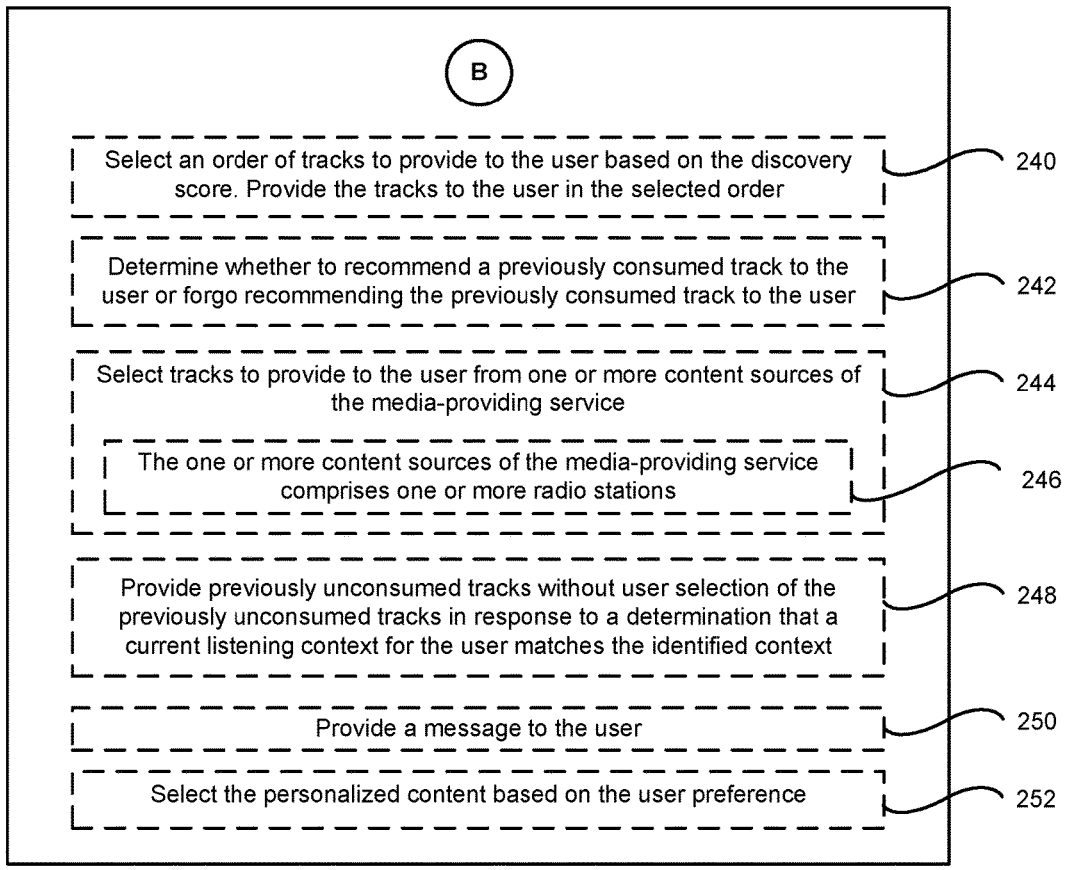

FIGS. 2A-2C are flow diagrams illustrating a method 200 for providing personalized content to a client device associated with a user, in accordance with some implementations. Method 200 may be performed (202) at an electronic device (e.g., media content server 104 or client device 102) having one or more processors and memory storing instructions for execution by the one or more processors. The electronic device is associated with a media-providing service (e.g., provides media content for playback to client devices 102 and/or media presentation systems 108 in a media content delivery system 100). In some implementations, the method 200 is performed by executing instructions stored in the memory of an electronic device (e.g., in memory 406, FIG. 4 or memory 312, FIG. 3). In some implementations, the method 200 is performed by a plurality of electronic devices, for example by a combination of a server system (e.g., media content server 104) and a client device (e.g., client device 102).

Referring now to FIG. 2A, in performing the method 200, for each track of a plurality of tracks (or more generally, media content items) consumed by a user of the media-providing service, the electronic device determines (204) whether the track has previously been consumed by (e.g., requested by, listened by, streamed to, provided to) the user based on the listening history of the user. For example, the electronic device determines whether the track is in the listening history of the user. In some embodiments, the track has been repeatedly consumed by the user (e.g., appears multiple times in the listening history of the user). In some embodiments, the listening history is stored as a list of tracks consumed by the user. In some embodiments, the electronic device (or another device) compiles the listening history by recording which tracks have been consumed by the user. In some embodiments, the listening history is stored (206) as a Bloom filter (or other probabilistic data structure) and whether the track has previously been consumed by the user is determined by querying the Bloom filter. To determine if a track was previously consumed by the user, the electronic device checks the listening history (e.g., queries the Bloom filter) to see if it already exists in the listening history. If the track is found to already be in the listening history, the track is marked as "previously discovered" and thus previously consumed. The Bloom filter thus may represent tracks that have already been consumed by the user. In some embodiments, the Bloom filter stores a minimal amount of information to make querying the Bloom filter more efficient. In some embodiments, in response to querying the Bloom filter, a return value of yes or no is obtained (e.g., yes, the track appears in the listening history; or no, the track does not appear in the listening history). In some embodiments, the listening history contains information regarding how many times a track was consumed by a user (e.g., maintains a count of how often tracks are repeated). The listening history may contain additional information (e.g., artist, album, genre, etc.) about the tracks consumed by the user and/or about listening contexts in which the tracks were consumed (e.g., time of day, day of a week, location (e.g., in the car, at home), etc.). In some embodiments, the listening history does not contain information regarding how many times a track was consumed by a user (e.g., the listening history indicates whether the track has been consumed or not, but does not indicate how often the track was repeated). In some embodiments, the listening history is stored at an electronic device (e.g., a server) distinct from (e.g., remote from) the electronic device performing the method 200. Alternatively, the listening history is stored at the electronic device that is performing the method 200 or a portion of the method 200.

The electronic device determines (208) a discovery score (e.g., metric) based on a number of the plurality of tracks determined to not have been previously consumed by the user (e.g., a number of the plurality of tracks that are not in the listening history of the user). (Equivalently, the discovery score may be based on a number of the plurality of tracks determined to have been previously consumed by the user, such as a number of the plurality of tracks that are in the user's listening history.) For example, the discovery score may be a proportion (e.g., a percentage, a ratio, etc.) of tracks that have been previously consumed (or equivalently, that have been previously consumed) by the user (e.g., are in the listening history of the user) to a total number of tracks in the listening history of the user (e.g., where the listening history of the user may represent a rolling window). In some embodiments, the total number of tracks in the listening history of the user represents a total number of tracks played (e.g., includes repeated tracks). In some embodiments, the total number of tracks in the listening history of the user represents a total number of unique tracks in the listening history (e.g., does not include repeated tracks).

In some embodiments, to calculate the discovery score, the electronic device calculates (210) an average preference of the user for selecting previously unconsumed tracks (or equivalently, for selecting previously consumed tracks) measured over a time window. In some embodiments, the time window is a rolling time window. For example, the rolling time window may include a previous (e.g., most recent) number of hours, days, weeks, months, sessions, etc. (e.g., the last 30 days, month, year, five years, etc.). In some embodiments, the time window begins from the time the user began using the media-providing service. In some embodiments, the time window is a current user session in which the user uses the media-providing service. A session may represent moments in which a user interacts with the media-providing service. For example, the electronic device may determine that the user's discovery score for the current session is greater than the user's historical discovery score, which could indicate that the user is currently in a high-discovery mode of exploring new content and thus should be provided with new content.

In some embodiments, to calculate the discovery score, the electronic device calculates (212) an average preference of the user for selecting previously unconsumed tracks (or equivalently, for selecting previously consumed tracks) measured over a number of successive tracks consumed by the user. For example, the average preference may be calculated for a last number of tracks consumed by the user (e.g., the listening history includes at least the last N consumed tracks, where N is a predefined integer, and the discovery score is determined for the last N consumed tracks). In some embodiments, the electronic device calculates (214) an average preference of the user for selecting previously unconsumed tracks (or equivalently, for selecting previously consumed tracks) measured over a single session for the user (e.g., a current session). In some embodiments, the average preference of the user is calculated for a plurality of sessions (e.g., a number of successive sessions). For example, the calculated average preference of a current session may be compared to a historical record of calculated average preferences for one or more previous sessions (e.g., to identify variability of the discovery score over a period of time).

In some embodiments, the electronic device determines (216) a personalized ratio of previously unconsumed tracks to previously consumed tracks to be provided to the user. Alternatively, the electronic device determines a personalized fraction (e.g., percentage) of tracks to be provided to the user that have previously been consumed (or unconsumed). In some embodiments, the personalized ratio is proportional to the discovery score. For example, where a user is considered to have a high discovery score (e.g., where the discovery score satisfies a threshold), corresponding to consuming a high proportion of new tracks as compared to repeated tracks, the personalized ratio (or personalized fraction) may be modified (e.g., increased), such that the user will be provided with more unconsumed tracks as compared to previously consumed tracks.

In some embodiments, the electronic device determines (218) whether the discovery score of the user satisfies (or does not satisfy) a threshold discovery score. The threshold may be a predefined threshold. For example, satisfying the threshold discovery score may indicate that the number of new (i.e., previously unconsumed) tracks consumed by the user is greater than the number of repeated (i.e., previously consumed) tracks consumed by the user.

Referring to FIG. 2B, in some embodiments, the electronic device verifies (220) that an amount of use of the media-providing service by the user satisfies a threshold. For example, a new user of the media-providing service will have a high discovery score because the listening history of the user is limited (e.g., most tracks consumed by a new user have not previously been consumed by a user). Such a user may be excluded from subsequent steps of the method 200, because the discovery score for the user who has not consumed many tracks does not provide an accurate indication of the user's degree of preference for discovering new tracks.

In some embodiments, the electronic device identifies (222) a listening context for the user in which the discovery score satisfies a threshold (e.g., the threshold may be the same threshold as or a different threshold than determined in step 218). A listening context may include a time of day, a day of the week, or other contexts such as location. For example, the electronic device may identify that the discovery score satisfies a threshold when a user consumes tracks in a vehicle, but does not satisfy the threshold when the user consumes tracks at home. Thus, the discovery score may indicate the user is more open to discovering new content in certain listening contexts. For example, the electronic device may identify a context in which the discovery score of the user satisfies a threshold.

In some embodiments, the electronic device determines (224) a user preference for a first content type over a second content type based in part on the discovery score. For example, a determination that the discovery score satisfies a threshold, such that the user likes to discover new tracks, may cause the electronic device to identify whether the user has a preference for discovering new tracks of a particular type (e.g., genre) and to provide tracks of the identified type to the user. In another example, a high discovery score may indicate a user has a preference for new experiences (e.g., is adventurous) and thus may have a preference for messages (e.g., advertisements) directed to new experiences.

In some embodiments, the electronic device provides (226) personalized content to the user based on the discovery score. For example, providing personalized content can include presenting personalized content to the user, recommending (228) personalized content for the user, and/or displaying personalized content for the user. In some embodiments, providing personalized content is performed without user selection of the personalized content (e.g., the providing is performed automatically without user input). In some embodiments, the electronic device presents (230) tracks previously consumed by the user (e.g., tracks in the listening history of the user) and excludes presenting tracks not previously consumed by the user (e.g., tracks not in the listening history of the user) in response to a determination that the discovery score of the user does not satisfy the threshold discovery score. For example, for a user with a discovery score that satisfies the threshold (e.g., a high discovery score, or alternatively a low discovery score if the discovery score is defined to decrease as the preference for discovering new content increases), the electronic device may present new tracks to the user because the user has shown a tendency to consume new content often rather than repeatedly consuming the same content. In some embodiments, the electronic device increases (232) a number of tracks previously consumed by the user to be presented to the user and decreases a number of tracks not previously consumed by the user to be presented to the user in response to a determination that the discovery score of the user does not satisfy the threshold discovery score. In some embodiments, the electronic device presents (234) to the user tracks previously unconsumed by the user in response to a determination that the discovery score of the user satisfies the threshold discovery score (e.g., a user with a high discovery score will be presented with new content). In some embodiments, the electronic device selects (236) content (e.g., tracks, messages, playlists, etc.) to recommend to the user based on the personalized ratio or fraction (e.g., the personalized ratio determined in step 216).

In some embodiments, the personalized content is provided (238) in response to verifying that the amount of use of the media-providing service by the user satisfies the threshold (e.g., as determined in step 220) and thus that the discovery score is a reasonable indication of the user's degree of preference for discovering new tracks.

Referring to FIG. 2C, in some embodiments, the electronic device selects (240) an order of tracks (e.g., in a playlist) to provide to the user based on the discovery score. The electronic device provides the tracks to the user in the selected order. For example, if the discovery scores satisfies a threshold, the electronic device may prioritize previously unconsumed tracks (e.g., order unconsumed tracks before previously consumed tracks, or provide a higher ratio of unconsumed to previously consumed tracks in an earlier portion of the playlist than in a later portion of the playlist). In some embodiments, if the discovery score does not satisfy the threshold, the electronic device does not prioritize the unconsumed tracks. For example, if the discover score does not satisfy the threshold, or fails to satisfy a second threshold lower than the threshold, the electronic device prioritizes previously consumed tracks, or does not order the tracks based on whether they were previously consumed.

In some embodiments, the electronic device determines (242) whether to recommend a previously consumed track to the user or forgo recommending the previously consumed track to the user. For example, the previously consumed track is recommended if the discovery score does not satisfy the threshold and is not recommended if the discovery score satisfies the threshold.

In some embodiments, the electronic device selects (244) tracks to provide to the user from one or more content sources of the media-providing service. The one or more content sources of the media-providing service may comprise (246) one or more radio stations or playlists. In some embodiments, the electronic device selects the tracks to include in the one or more content sources of the media-providing service based on the discovery score. In some embodiments, the electronic device selects one or more content sources to provide (e.g., recommend) to the user based on the discovery score. For example, for a user with a discovery score that satisfies a threshold, the electronic device may recommend a playlist with previously unconsumed tracks (e.g., promote a "Discover Weekly" content set).

In some embodiments, selecting the tracks is further based on additional characteristics of the listening history of the user (e.g., genre, artist, album, etc.). In some embodiments, the electronic device provides (248) previously unconsumed tracks without user selection of the previously unconsumed tracks in response to a determination that a current listening context for the user matches the identified context of step 222. In some embodiments, the electronic device provides (250) a message (e.g., an advertisement) to the user. In some embodiments, the electronic device selects (252) the personalized content based on the user preference of step 224.

Although FIGS. 2A-2C illustrate a number of logical stages (e.g., steps) in a particular order, stages which are not order dependent may be reordered and other stages may be combined or broken out. For example, the stage of verifying that an amount of use of the media-providing service by a user satisfied a threshold may be performed before determining the discovery score of the user such that the determination of the discovery score is performed in response to the amount of use of the media-providing service satisfying the threshold. In some embodiments, a plurality of electronic devices may perform the different stages. For example, a first electronic device (e.g., a client device) may determine a current listening context of the user, while the listening history is stored at a second electronic device (e.g., a server system), and determining the discovery score may be performed by the first or the second electronic device.

While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

Figure 3:
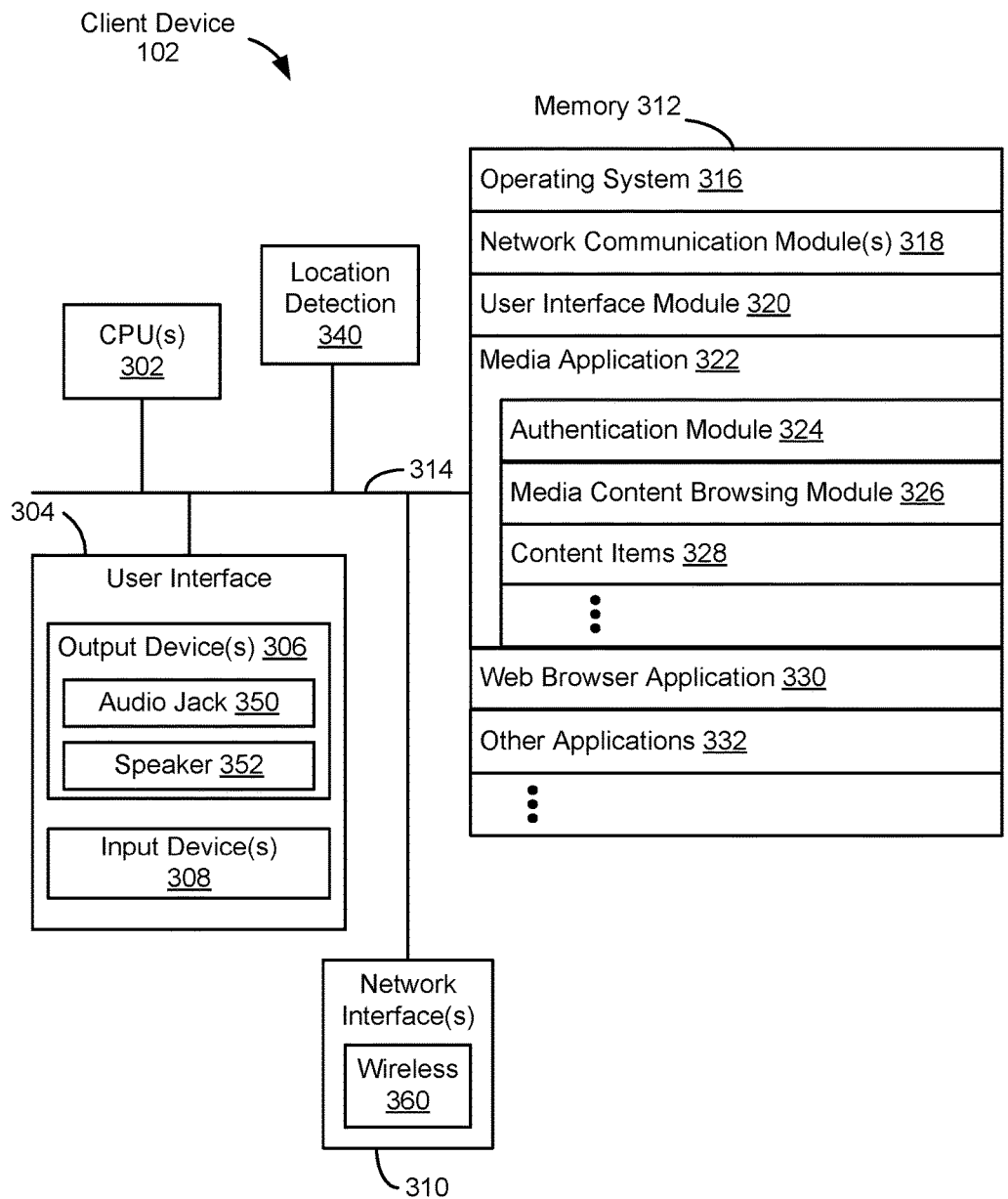
FIG. 3 is a block diagram illustrating a client device in accordance with some implementations.

FIG. 3 is a block diagram illustrating a client device 102 (e.g., client device 102-1 and/or client device 102-m, FIG. 1) in accordance with some implementations. The client device 102 includes one or more central processing units (CPU(s), i.e., processors or cores) 302, one or more network (or other communications) interfaces 310, memory 312, and one or more communication buses 314 for interconnecting these components. The communication buses 314 optionally include circuitry that interconnects and controls communications between system components.

As also shown in FIG. 3, the client device 102 includes a user interface 304, including output device(s) 306 and input device(s) 308. In some implementations, the input devices 308 include a keyboard, mouse, or track pad. Alternatively, or in addition, in some implementations, the user interface 304 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices 306 may include a speaker 352 (e.g., speakerphone device) and/or an audio jack 350 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 340, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 310 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 310 include a wireless interface 360 for enabling wireless data communications with other client devices 102, media presentations systems 108, and/or or other wireless (e.g., Bluetooth-compatible) devices (e.g., for streaming audio data to the media presentations system 108). Furthermore, in some implementations, the wireless interface 360 (or a different communications interface of the one or more network interfaces 310) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 312 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 312 may optionally include one or more storage devices remotely located from the CPU(s) 302. Memory 312, or alternately, the non-volatile memory solid-state storage devices within memory 312, includes a non-transitory computer-readable storage medium. In some implementations, memory 312 or the non-transitory computer-readable storage medium of memory 312 stores the following programs, modules, and data structures, or a subset or superset thereof:
- an operating system 316 that includes procedures for handling various basic system services and for performing hardware-dependent tasks;
- network communication module(s) 318 for connecting the client device 102 to other computing devices (e.g., media presentation systems 108, media content server 104, and/or other client devices) via the one or more network interface(s) 310 (wired or wireless) connected to one or more network(s) 112;
- a user interface module 320 that receives commands and/or inputs from a user via the user interface 304 (e.g., from the input devices 308) and provides outputs for playback and/or display on the user interface 304 (e.g., the output devices 306);
- a media application 322 (e.g., an application associated with and for accessing a media-providing service provided by a media content provider such as media content server 104, including a media player, a streaming media application, or any other appropriate application or component of an application) for browsing, receiving, processing, presenting, and requesting playback of media content (e.g., media items). The media application 322 may also be used to monitor, store, and/or transmit (e.g., to media content server 104) data associated with user behavior. The media application 322 also includes the following modules (or sets of instructions), or a subset or superset thereof:
  - an authentication module 324 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
  - a media content browsing module 326 for providing controls and/or user interfaces enabling a user to navigate, select for playback, and otherwise control or interact with media content, whether the media content is stored or played locally or remotely;
  - a content items module 328 storing media items (e.g., tracks) for playback;
- a web browser application 330 (e.g., Internet Explorer or Edge by Microsoft, Firefox by Mozilla, Safari by Apple, or Chrome by Google) for accessing, viewing, and interacting with web sites; and
- other applications 332, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 3 with respect to the client device 102.

Figure 4:
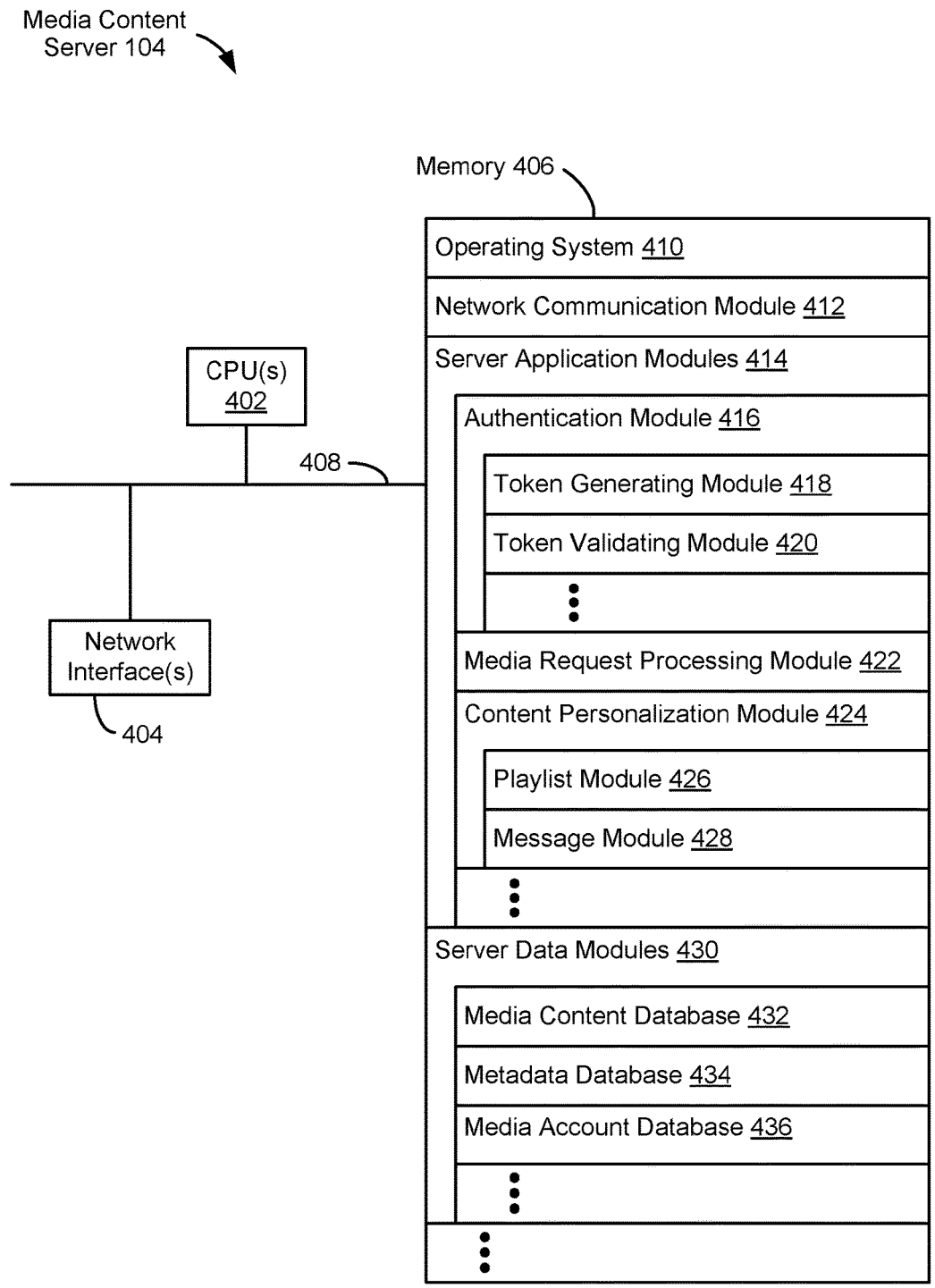
FIG. 4 is a block diagram illustrating a media content server in accordance with some implementations.

FIG. 4 is a block diagram illustrating a media content server 104 in accordance with some implementations. The media content server 104 typically includes one or more central processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 406, optionally, includes one or more storage devices remotely located from one or more CPUs 402. Memory 406, or, alternatively, the non-volatile solid-state memory device(s) within memory 406, includes a non-transitory computer-readable storage medium. In some implementations, memory 406, or the non-transitory computer-readable storage medium of memory 406, stores the following programs, modules and data structures, or a subset or superset thereof:
- an operating system 410 that includes procedures for handling various basic system services and for performing hardware-dependent tasks;
- a network communication module 412 that is used for connecting the media content server 104 to other computing devices via one or more network interfaces 404 (wired or wireless) connected to one or more networks 112;
- one or more server application modules 414 for performing various functions with respect to providing and managing a media-providing service, the server application modules 414 including, but not limited to, one or more of:
  - an authentication module 416 for managing authentication and/or authorization requests, the authentication module 416 including, but not limited to, one or more of:
    - a token generating module 418 for generating authentication tokens permitting use of media presentation systems 108; and
    - a token validating module 420 for verifying that an authentication token is valid (e.g., has not yet expired or has not yet been revoked);
  - a media request processing module 422 for processing requests for media content and facilitating access to requested media items by client devices (e.g., the client device 102) including, optionally, streaming media content to such devices and/or to one or more media presentation systems 108; and
  - a content personalization module 424 for providing personalized content (e.g., playlists, tracks, advertisements, tooltips, notifications, etc.) to users of the content service, including, but not limited to, one or more of:
    - a playlist module 426 for processing (e.g., selecting and/or generating) and storing data (e.g., playlists and/or tracks) for selecting content based on one or more metrics (e.g., a discovery score); and
    - a message module 428 for processing (e.g., selecting and/or generating) messages (e.g., advertisements and/or recommendations) to be provided to the user based on one or more metrics (e.g., a discovery score);
- one or more server data module(s) 430 for handling the storage of and access to media items and metadata relating to the media items; in some implementations, the one or more server data module(s) 430 include:
  - a media content database 432 for storing media items (e.g., audio files, video files, text files, etc.);

a metadata database 434 for storing metadata relating to the media items; and a media account database 436 for storing account information for user media accounts, including user profiles (e.g., demographic groups), credentials (e.g., user identifiers, passwords, email addresses, etc.), credentials or identifiers of any linked accounts, and the like.

The memory 406 (e.g., the content personalization module 424) may include instructions for performing the method 200 (FIGS. 2A-2C) or a portion thereof.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 312 and 406 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 312 and 406 optionally store a subset or superset of the respective modules and data structures identified above. Furthermore, memory 312 and 406 optionally store additional modules and data structures not described above.

Although FIG. 4 illustrates the media content server 104 in accordance with some implementations, FIG. 4 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising at an electronic device associated with a media-providing service having one or more processors and memory storing instructions for execution by the one or more processors:

for each track of a plurality of tracks consumed by a user of the media-providing service:
receiving, over a time window, an indication of user selection of the track to compile a listening history of the user with the media-providing service; and
determining, based on the listening history of the user with the media-providing service, whether the track has previously been consumed by the user;

measuring, over the time window, an average preference of the user for selecting previously unconsumed tracks;

determining, for the user, a discovery score corresponding to the average preference of the user for selecting previously unconsumed tracks, including determining the average preference of the user for selecting previously unconsumed tracks measured over the time window;

determining whether the discovery score of the user satisfies a threshold discovery score; and in response to determining that the discovery score of the user does not satisfy the threshold discovery score, streaming tracks to the user for playback that have been previously consumed by the user and excluding providing tracks to the user for playback that have not been previously consumed by the user.

2. The method of claim 1, further comprising, in response to determining that the discovery score of the user does not satisfy the threshold discovery score, recommending a track to the user based on the discovery score.

3. The method of claim 1, wherein the streaming and excluding comprise increasing a number of tracks previously consumed by the user to be presented to the user and decreasing a number of tracks not previously consumed by the user to be presented to the user, in response to determining that the discovery score of the user does not satisfy the threshold discovery score.

4. The method of claim 1, further comprising, at the electronic device, determining a personalized ratio of previously unconsumed tracks to previously consumed tracks to be provided to the user, wherein the personalized ratio is proportional to the discovery score; and in response to determining that the discovery score of the user does not satisfy the threshold discovery score, selecting a track to recommend to the user based on the personalized ratio.

5. The method of claim 1, further comprising, at the electronic device, verifying that an amount of use of the media-providing service by the user satisfies a threshold;

wherein the streaming and excluding are performed in response to verifying that the amount of use of the media-providing service by the user satisfies the threshold.

6. The method of claim 1, wherein:

the listening history is stored as a Bloom filter; and determining whether the track has been previously consumed by the user comprises querying the Bloom filter.

7. The method of claim 1, wherein determining the discovery score comprises calculating the average preference of the user for selecting previously unconsumed tracks measured over a number of successive tracks consumed by the user.

8. The method of claim 1, wherein the time window corresponds to a single session for the user.

9. The method of claim 1, wherein streaming the tracks comprises:

selecting an order of the tracks to provide to the user based on the discovery score; and streaming the tracks to the user in the selected order.

10. The method of claim 1, further comprising, in response to determining that the discovery score of the user does not satisfy the threshold discovery score, determining whether to recommend a previously consumed track to the user or forgo recommending the previously consumed track to the user.

11. The method of claim 1, wherein streaming the tracks comprises streaming tracks from one or more content sources of the media-providing service.

12. The method of claim 11, wherein the one or more content sources of the media-providing service comprise one or more radio stations.

13. The method of claim 1, further comprising, at the electronic device:

identifying a listening context for the user in which the discovery score satisfies a threshold; and streaming previously unconsumed tracks without user selection of the previously unconsumed tracks, in response to a determination that a current listening context for the user matches the identified context.

14. The method of claim 1, further comprising, at the electronic device:

determining a user preference for a first content type over a second content type, based in part on the discovery score; and selecting the tracks to stream based on the user preference.

15. An electronic device associated with a media-providing service, comprising:

one or more processors; and memory storing one or more programs for execution by the one or more processors, the one or more programs comprising instructions for:

for each track of a plurality of tracks consumed by a user of the media-providing service:

receiving, over a time window, an indication of user selection of the track to compile a listening history of the user with the media-providing service; and determining, based on the listening history of the user with the media-providing service, whether the track has previously been consumed by the user;

measuring, over the time window, an average preference of the user for selecting previously unconsumed tracks;

determining, for the user, a discovery score corresponding to the average preference of the user for selecting previously unconsumed tracks, including determining the average preference of the user for selecting previously unconsumed tracks measured over the time window;

determining whether the discovery score of the user satisfies a threshold discovery score; and in response to determining that the discovery score of the user does not satisfy the threshold discovery score, streaming tracks to the user for playback that have been previously consumed by the user and excluding providing tracks to the user for playback that have not been previously consumed by the user.

16. A non-transitory computer-readable storage medium storing one or more programs configured for execution by an electronic device associated with a media-providing service, the one or more programs comprising instructions for:

for each track of a plurality of tracks consumed by a user of the media-providing service:

receiving, over a time window, an indication of user selection of the track to compile a listening history of the user with the media-providing service; and determining, based on the listening history of the user with the media-providing service, whether the track has previously been consumed by the user;

measuring, over the time window, an average preference of the user for selecting previously unconsumed tracks;

determining, for the user, a discovery score corresponding to the average preference of the user for selecting previously unconsumed tracks, including determining the average preference of the user for selecting previously unconsumed tracks measured over the time window;

determining whether the discovery score of the user satisfies a threshold discovery score; and in response to determining that the discovery score of the user does not satisfy the threshold discovery score, streaming tracks to the user for playback that have been previously consumed by the user and excluding providing tracks to the user for playback that have not been previously consumed by the user.

* * * * *